United States Patent [19]

Boshold

[11] 4,154,081
[45] May 15, 1979

[54] METHOD AND APPARATUS FOR CHANGING A DIE RING FROM THE DIE IN AN INDIRECT EXTRUSION PRESS

[75] Inventor: Raymond F. Boshold, Springfield, Pa.

[73] Assignee: Wean United, Inc., Pittsburgh, Pa.

[21] Appl. No.: 817,959

[22] Filed: Jul. 21, 1977

[51] Int. Cl.² .................. B21C 26/00; B21C 35/06
[52] U.S. Cl. .................................... 72/263; 72/253 A
[58] Field of Search ............ 72/253, 255, 263, 270, 72/422, 264

[56] References Cited

U.S. PATENT DOCUMENTS

| | | | |
|---|---|---|---|
| 2,929,499 | 3/1960 | Turner | 72/263 |
| 3,157,283 | 11/1964 | Maass et al. | 72/264 |
| 3,522,721 | 8/1970 | Whiting | 62/255 |
| 3,530,702 | 9/1970 | De Ridder | 72/263 X |
| 3,977,226 | 8/1976 | Mann et al. | 72/253 |

FOREIGN PATENT DOCUMENTS 1144219  4/1960  Fed. Rep. of Germany ............ 72/270

Primary Examiner—C. W. Lanham
Assistant Examiner—D. M. Gurley
Attorney, Agent, or Firm—Daniel Patch; Suzanne Kikel

[57] ABSTRACT

This disclosure pertains to a method and device for changing a die ring to and from a die in an indirect extrusion press. Once the die-die ring assembly is exposed from the container of the press, the changing device consisting of a rotating arm having opposed relatively movable jaws is caused to engage the die ring and remove it from the extrusion axis of the press, and after treatment, if necessary, to return it to the extrusion axis and place it on the die.

In the operation of indirect extrusion presses it has been the normal practice to employ a composite die assembly consisting of a die and outer encircling die ring. After completion of the extrusion operation the die ring is removed from the back of the container and either the same die ring or a second one is placed back on the die after the die or the container has been moved to position the die at the front of the container.

1 Claim, 12 Drawing Figures

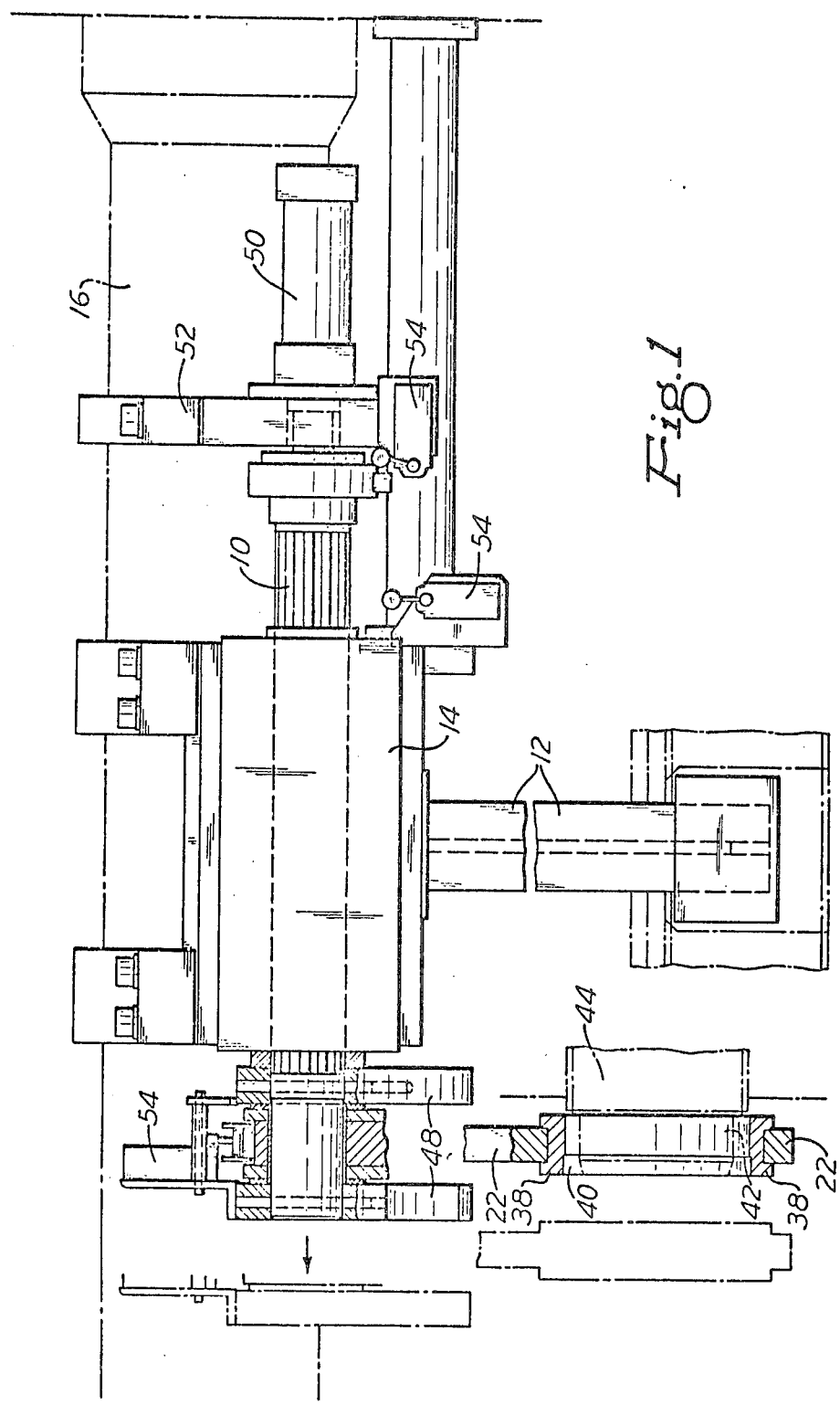

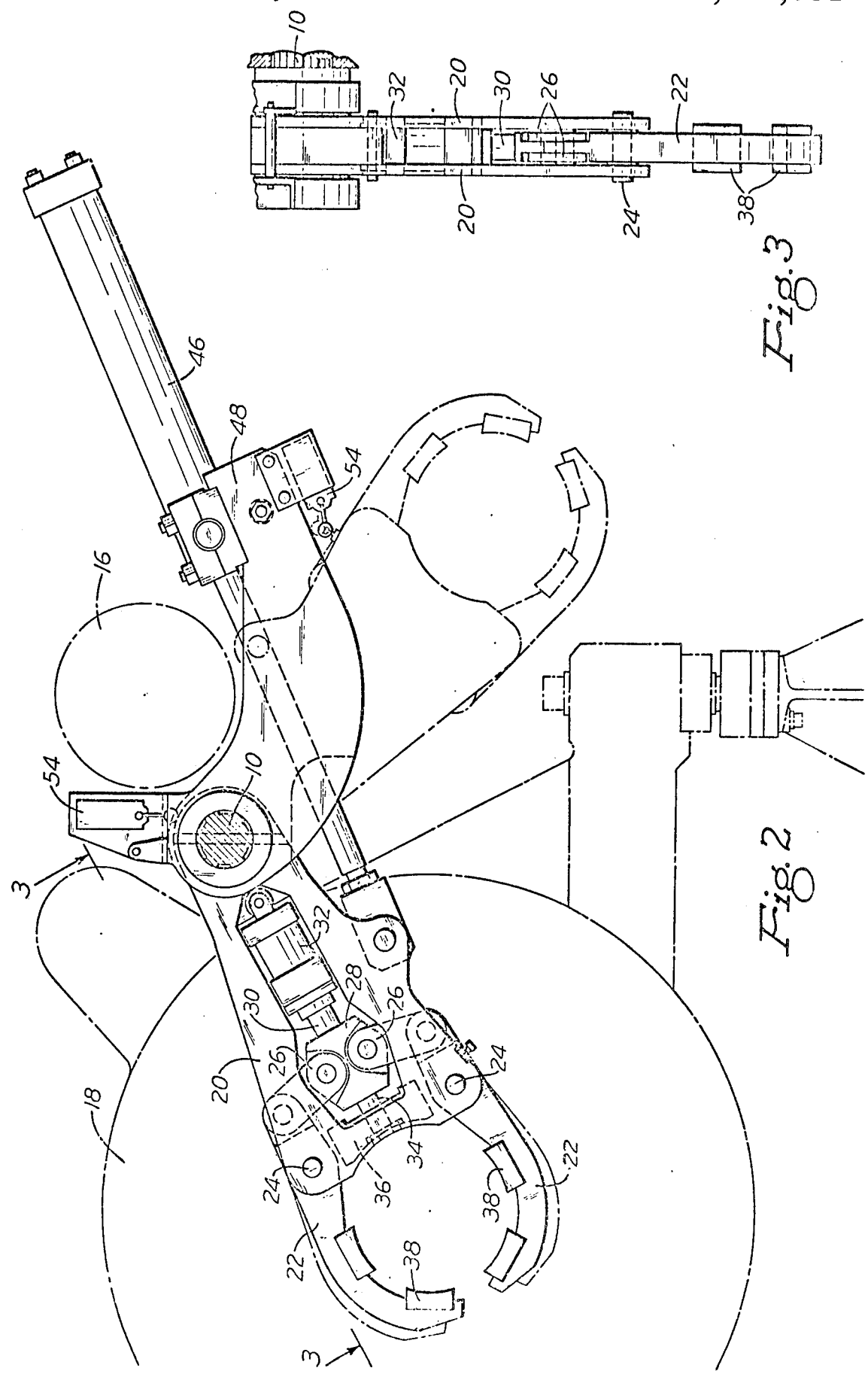

METHOD AND APPARATUS FOR CHANGING A DIE RING FROM THE DIE IN AN INDIRECT EXTRUSION PRESS

The present invention pertains to providing a method and apparatus for mechanizing the removal and/or replacement of the die ring to and from the die. Such a method and apparatus has the salutary advantage of greatly reducing the time and manpower required to handle the die ring, and hence substantially increasing the production rate of the press and reducing its overall operating expense.

More particularly the present invention provides in combination with an extrusion press for producing elongated articles, wherein said press employs a composite die and die ring assembly and a container, a die ring changing mechanism comprising:

a clamping means including means for optionally gripping the die ring when the die is located in an exposed position relative to said container on the operating extrusion axis of the press, and means for moving said clamping means to and from the said extrusion axis, and a support for said clamping means.

The present invention also provides a method of operating an indirect extrusion press having a container, a die stem, a die-die ring assembly mounted on said die stem, power means for causing relative movement between the die-die ring assembly and said container to effect an extrusion, and a die ring changing device for removing a die ring from said die, the steps comprising: causing relative movement between said die-die ring assembly and said container to remove the die-die ring assembly from said container sufficient enough to expose the die ring for removal from said die, causing said die ring changing device to move in a manner to support said exposed die ring and thereafter causing said die ring changing device to move a second time in a manner to remove said die ring from said die and causing it to be transferred away from said die to a remote station.

These objects will be better appreciated when the following description of one embodiment of the present invention is read along with the accompanying drawings of which:

FIG. 1 is a plan view, partly in section, of a die ring changing device built in accordance with the present invention;

FIG. 2 is an elevational end view of the die ring changing device illustrated in FIG. 1, showing the device in a ready position on the extrusion axis of the press to remove or replace a die ring, and in a phantom position remote from said extrusion axis;

FIG. 3 is a sectional view taken on lines 3—3 of FIG. 2; and

Figure 4:
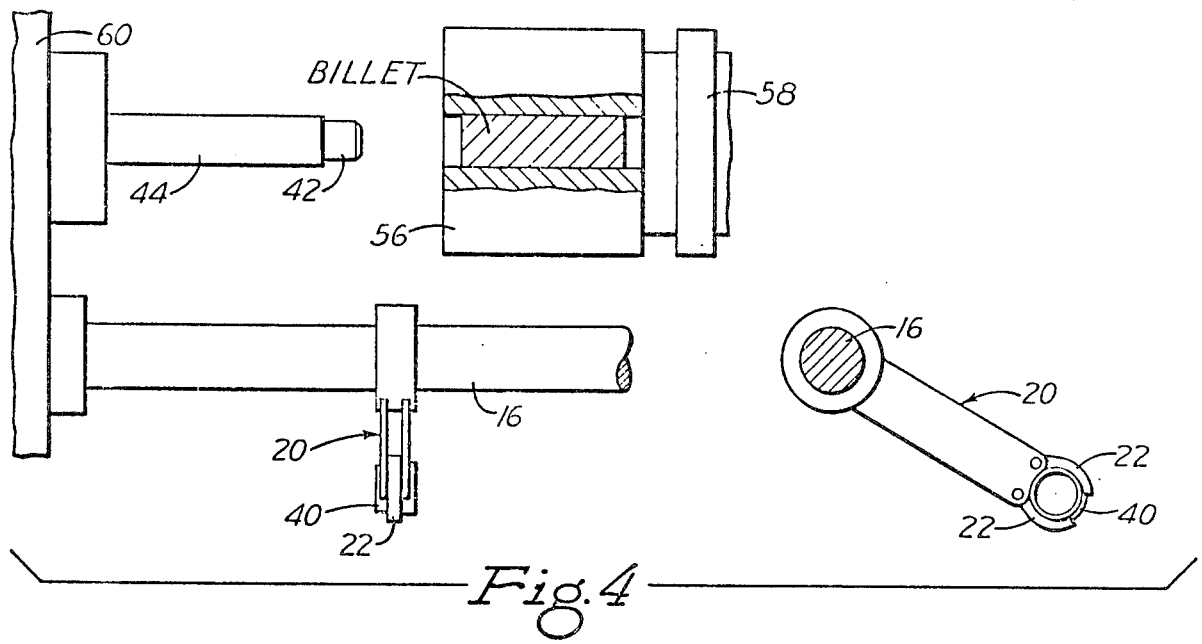
FIGS. 4–12 are a series of elevational sequential views illustrating the principle steps employed by a die ring changing device of the present invention in removing and replacing a die ring from a die in an indirect extrusion press of which the container and die stem thereof are also illustrated.

Before referring to the drawings, brief mention will be made of the several prior U.S. patents disclosing the use of a die ring in an indirect extrusion press: namely U.S. Pat. Nos. 3,522,721; 3,630,644; and 3,977,226.

Referring first to FIGS. 1, 2 and 3, which as noted, illustrate the detail construction of the die ring changer, the support components thereof consist of a horizontally arranged non-rotatable splined shaft 10 supported by a pedestal 12, shown only in FIG. 1, for axial movement relative thereto. The shaft 10 and a stationary housing 14 provided for it are situated between a tie rod 16 of the press and the container housing 18 thereof, it also being appreciated that in FIG. 2, the container housing is concentric with the extrusion axis of the press. As one views FIG. 1, to the left of the housing 14 there is mounted on the shaft 10, in a cantilever fashion, an arm 20 which is affixed to the shaft so that it both rotates and moves axially. At the lower end of the arm 20, two opposed jaws are formed by jaw members 22 being pivotally supported on the arm by pins 24 and having projecting inner ends to which links 26, are pivotally secured. The other ends of the links 26 are in turn pivotally secured to a block 28, to which a piston rod 30 of a piston cylinder assembly 32 is connected. The piston cylinder assembly 32, as best shown in FIG. 3, is mounted centrally in an opening formed in the arm 20, and connected thereto at its back. To the front of the block 28 a guide rod 34 is provided which is also mounted in the arm by a retainer block 36.

The interior of the jaw members 22 are formed to encircle and grip the die ring for which purpose they each have a pair of gripping pads 38. This encircling relationship is best shown in FIG. 1 where the jaw members 22 are shown in their gripping relation with a die ring 40, the die ring actually being shown with a die 42 and a die stem 44. The entire arm and jaw assembly is rotatable about the shaft 10, by a piston cylinder assembly 46, pivotally connected by a stationary arm 48, but which can move axially guided in the housing 14. FIG. 2 illustrates the arm 20 and more particularly the jaw assembly in its die ring supporting position relative to the die 42 and in a phantom position remote therefrom where the die ring can be, if desired, treated such as by cooling and cleaning or replaced. In addition, should instead of moving the container relative to the die in the indirect extrusion process, the die should be moved relative to the container, then in the remote treating station for the die ring the ring can be transferred from one side of the container to the other side where it will be placed again on the die preparatory to the next extrusion operation.

The shaft 10 is designed, as noted previously, to move axially in order to effect a removal and replacement of the die ring to and from the die and for this reason at the back of the shaft 10, as one views FIG. 1, a piston cylinder assembly 50 is provided being secured to a support 52. The axial movements of the shaft 10 and more particularly of the gripper assembly, can be automated, if desired, and in any event the extremes of its movement is controlled by four limit switches which appear in FIGS. 1 and 2, and which are identified by the reference character 54.

In referring now to the preferred method of utilizing the die ring changer above described, reference will be made to FIGS. 4 through 12. The same reference numbers shown in FIGS. 1–3, will be employed in the sequential drawings 4 through 12, even though for simplicity reasons, they may take a slightly different form. One quickly discernable difference is that in FIGS. 4 through 12 the die ring changer is mounted for rotation and axial movement on the tie rod 16 of the press instead of on a pedestal 12. Also, the die stem, die and container housing are arranged opposite hand in the sequential drawings from the arrangement shown thereof in FIGS. 1–3.

In first identifying the elements of the sequential drawings not appearing in FIGS. 1–3, there is illustrated a container 56, that is received in the container housing 18, the container and its housing being movable to the left and right as one views FIGS. 4 through 12 by a main ram 58. Also shown in FIGS. 4 through 12 is a platen 60 which receives the die stem 44 and the tie rod 16.

Figure 5:
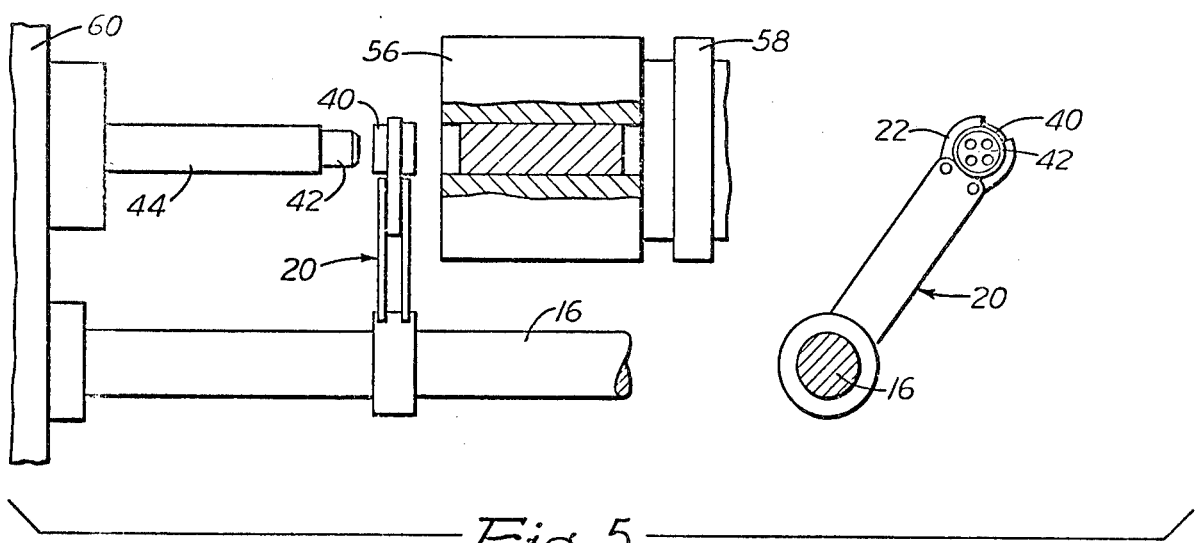
Figure 6:
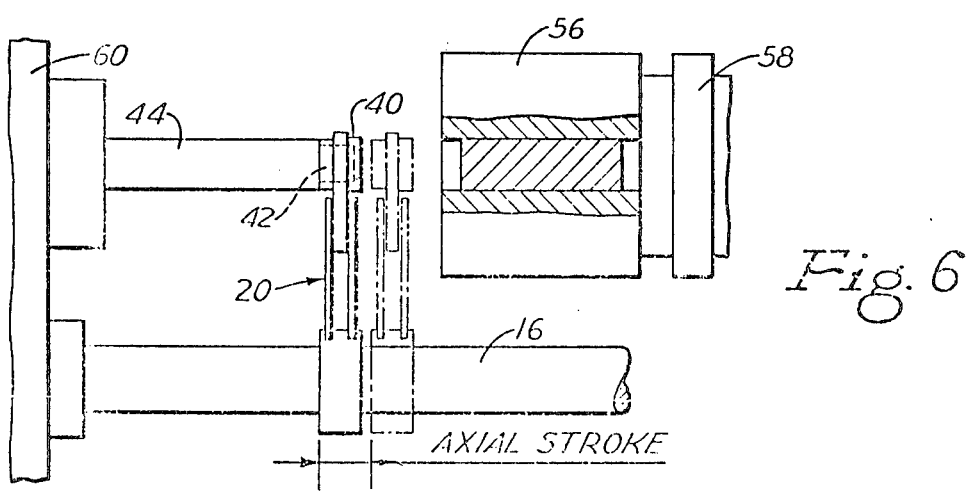
Figure 7:
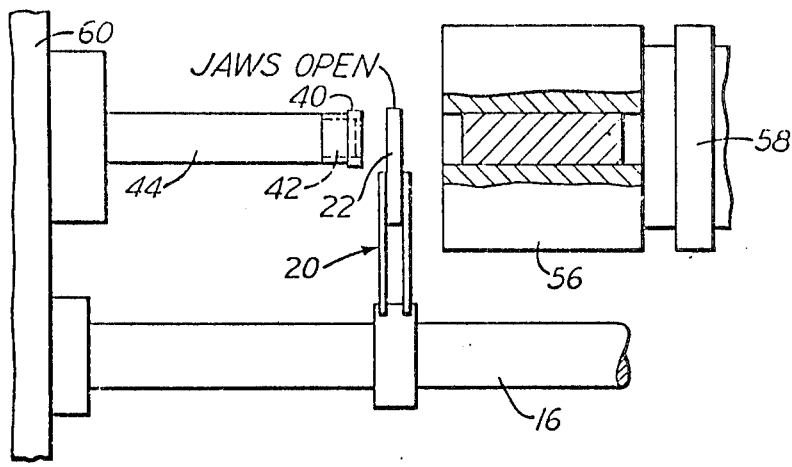

Since in these sequential drawings only the die ring changer and the container are movable elements the progression and synergistic use of the die changer will be self-apparent. In FIG. 4 a heated metal billet is shown in the container 56, positioned in front of the die 42 in which the die ring changer is in the remote position, i.e., the processing station, having received a die ring 40 and is in readiness to be brought into a position where the die ring 40 is located on the extrusion axis of the press in between the die 42 and the container 56, which position is illustrated in FIG. 5, wherein the schematic end view of the die changer and the end view of the die 42 is shown. In FIG. 6, the die changer has been moved to the left as depicted in a comparison of the phantom view and the hard line view. In FIG. 7 the die ring changer has placed the die ring over the die and has been moved to the right relative thereto to a position where it can be brought back to the treatment station position as shown in FIG. 4. The legend "Jaws Open" appearing in FIG. 7 emphasizes that as distinguished from the "Jaws Close" condition of the die ring changer as shown in FIGS. 4 and 5, once the die ring changer has been brought to the position in hard line in FIG. 6, the jaws 22 are opened and remain so until the die ring changer is brought back to the position on line with the extrusion axis for removal of the die ring.

This latter position is shown in FIG. 8, where again the legend denotes that the jaws 22 are in their open position in front of the die 42 and die ring 40 preparatory to removing the die ring from the die. It is important to note in comparing FIGS. 7 and 8 that the main ram 58 has been operated to move the container 56 and the heated billet contained therein so as to effect an extrusion of the billet into a form appearing graphically in FIG. 8 which is meant to represent a hollow metal tubing.

Figure 8:
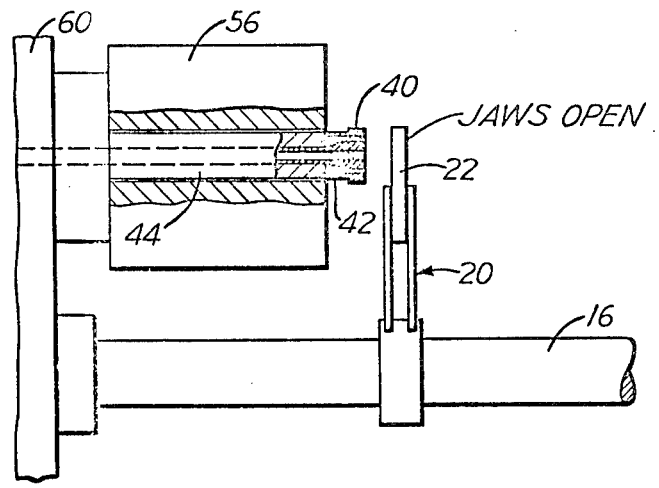
Figure 9:
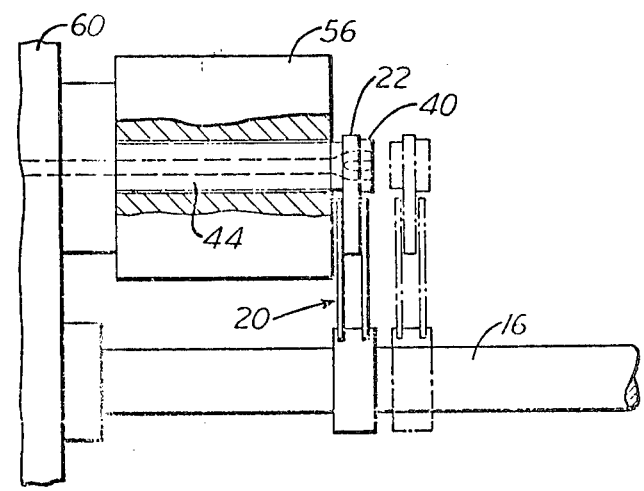
Figure 10:
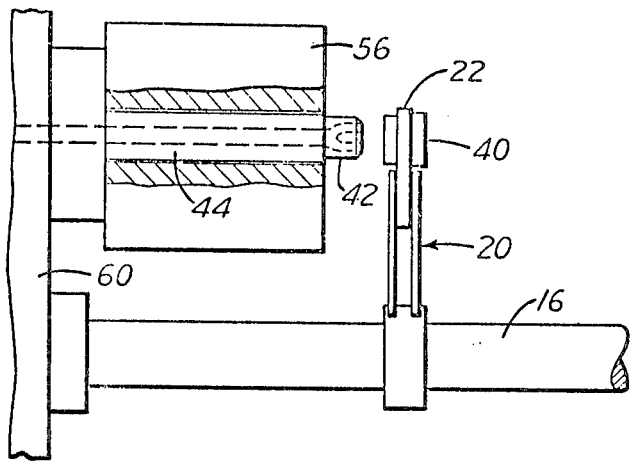
Figure 11:
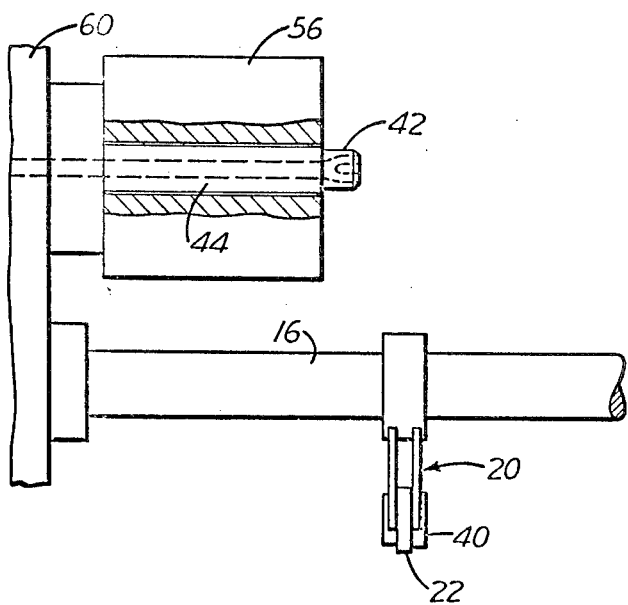

It is also to be understood in the extreme left position of the container 56, as shown in FIG. 8, that the usual butt formed at the end of the extrusion has been exposed by movement of the container and in the exposed condition has been sheared away from the extruded tubing. After this occurs the container 56 is moved still a slight bit further to the left as one views FIG. 8 to expose the die 42 and the die ring 40 as shown in FIG. 8. Once so exposed and with the die changer positioned with jaws open on the press extrusion axis, the changer is moved to the left as shown in FIG. 9 to encircle and grip the die ring 40 after which the changer is moved to the right as shown in FIG. 10, and thereafter rotated to the remote position of the treatment station. While the die ring, if necessary, is being cooled, cleaned or replaced in the remote position, the container 56 is returned to the right as shown in FIG. 12 where it receives another heated billet for extrusion in preparation of the return of the clean or new die ring to the position corresponding to FIG. 5.

Figure 12:
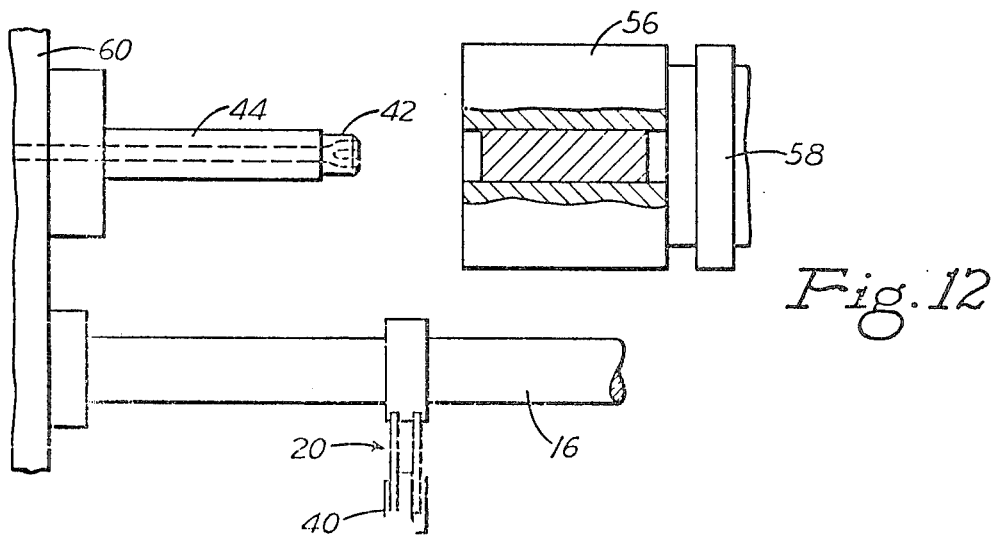

It is important to note in comparing FIG. 4 with FIG. 12 because a hollow extrusion is being produced in which connection the die 42 includes a mixing chamber that the die and particularly the chamber is full of metal which metal attaches to the metal that has been extruded. FIG. 12 graphically illustrates the connection of the metal in the chamber of die 42 with the extruded tubing. Because of the employment of the mixing chamber the die and die ring cannot be made in one piece and the die itself cannot be removed from the press. Of course in presses producing solid shapes the complete die assembly can be removed since no mixing chamber is employed in solid shaped dies.

In accordance with the provisions of the patent statutes, I have explained the principle and operation of my invention and have illustrated and described what I consider to represent the best embodiment thereof.

I claim:

1. In combination with an indirect extrusion press for producing an elongated article wherein said press employs a composite die-die ring assembly and wherein said die ring has a circular holding surface and said press further includes a container and at least one tension rod, said container being arranged coaxially with said die-die ring assembly, and said tension rod with respect to said axis being arranged radially about said axis outward of said container,
 a clamping means including:
 a die ring changing mechanism for removing and replacing a die ring to and from the die,
 a splined shaft arranged to extend parallel to said tension rod adjacent to the cooperative working positions of said die-die ring assembly and container,
 a support means for supporting said splined shaft in a manner to allow axial movement thereof,
 a first arm means extending radially from said shaft to said die axis when in one of its operational positions and having two open jaws constructed and arranged to encircle at least substantially the entire holding surface of a die ring, and power means for causing said jaws to engage and disengage a die ring for optionally gripping a die ring when the die is located in an exposed position relative to said container on said axis of the die,
 means for securing said first arm means to said shaft for rotational movement relative to said shaft and for axial movement with said shaft,
 the relationship of said first arm with respect to said shaft is such that said first arm moves transversely of said die-die ring assembly in an arc in which during such travel said first arm means always falls approximately within parallel planes tangential to diametric opposite points of said container,
 second arm means stationarily secured at one end to said shaft and extending in a direction away from said shaft and said first arm means,
 means connected to said shaft for moving said first arm means in opposite directions parallel to said axis to remove and replace a die ring to and from the die when said jaws are adjacent to said axis, and
 means mounted on said other end of said second arm means connected to said first arm means for moving said first arm means in said transverse path to and from said axis to remove and to return a die ring to and from said axis.

* * * * *